April 10, 1951  J. B. HORD  2,548,023
DRAIN OPENER
Filed Jan. 20, 1950
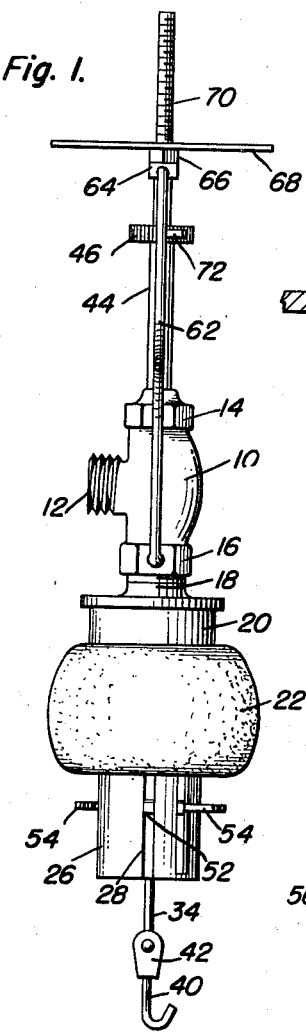
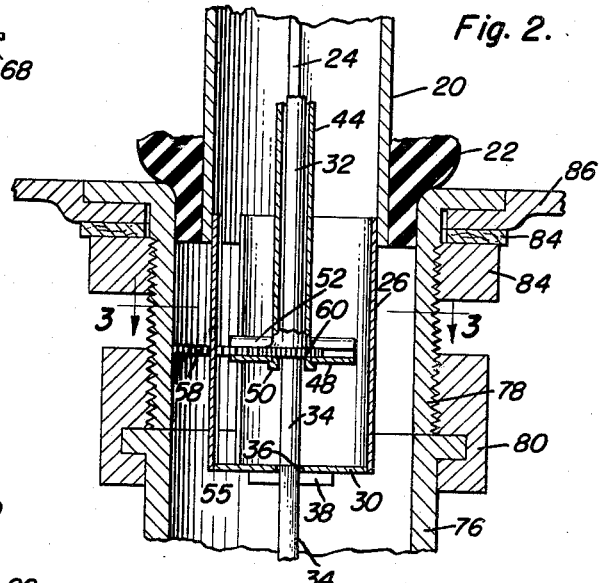
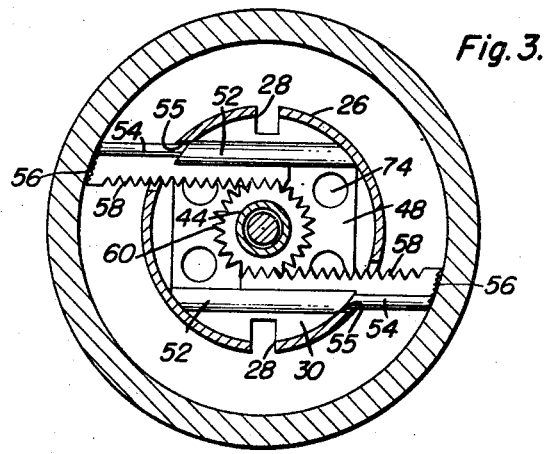
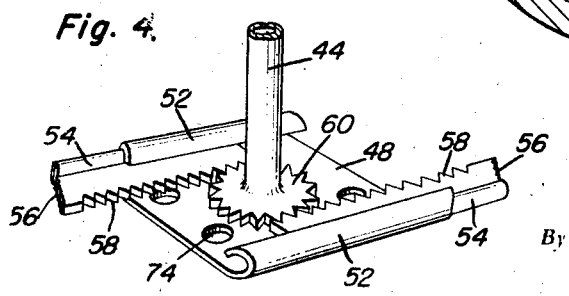
Inventor
Joseph B. Hord
By Clarence A. O'Brien
and Harvey B. Jacobson
Attorneys Patented Apr. 10, 1951

2,548,023

UNITED STATES PATENT OFFICE 2,548,023

DRAIN OPENER

Joseph B. Hord, Maxton, N. C.

Application January 20, 1950, Serial No. 139,651

4 Claims. (Cl. 285—44)

This invention relates generally to plumbers' tools and more particularly to a device whereby pressurized fluid may be directed into a blocked drain pipe with a view to unblocking the drain pipe.

A primary object of this invention is to facilitate the attachment of a source of pressurized fluid with a drain pipe, it being understood that this fluid may be air or water or certain commercial cleaning fluids, or water burdened with chemicals of a detergent nature.

Another object of this invention is to provide a connecting means for a conduit in a drain pipe which will positively prevent splashing of liquids used with the device or escape of any other fluids used with the device, even when the fluid is applied at considerable pressures.

Another object of this invention is to provide a device of the character mentioned above which is adaptable for use with drain pipes of various sizes, and with drain pipes having outlets with cross bar strainer structure as well as with drain pipes having plain outlets.

Yet another object is to provide a device of the character mentioned above which can be very easily and quickly inserted in a drain pipe, in the outlet at the base of a toilet bowl, tub basin or the like, which will be safe, durable and efficient, and which will be inexpensive and practicable to manufacture.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the assembled device;

Figure 2 is a fragmentary, enlarged, vertical sectional view of a central portion of the device, and the view includes portions of an environment wherewith this invention may be used;

Figure 3 is a horizontal sectional view taken substantially on the line 3—3 in Figure 2; and Figure 4 is a view, in perspective, of the drain pipe engaging jaws together with the supporting and actuating means therefor.

Similar characters of reference designate similar or identical elements and portions throughout the specification and throughout the different views in the drawings.

Referring now to the drawings in detail, this invention includes a conduit 10 which may be of spiral form and equipped with a threaded inlet 12, a screw cap 14 at the upper end and a nut integral with the lower end, as indicated at 16. The nut 16 screws onto the neck portion 18 of an outer cylinder 20 which is hollow and which carries deformable resilient collar 22. The collar 22 may be adhesively or otherwise secured to the exterior surface of the outer cylinder 20. The outer cylinder 20 has internal longitudinally extending ribs 24.

An inner cylinder 26 is telescopically arranged within the outer cylinder 22 and this inner cylinder has longitudinally extending grooves 28 to receive the ribs 24, whereby the inner cylinder may move longitudinally relative to the outer cylinder but cannot be rotated relatively thereto. It will be noted that the inner cylinder always projects downwardly a short distance from the end of the outer cylinder 20. The inner cylinder 26 is closed at the lower end by an end plate 30.

A rod 32 extends coaxially of the cylinder, and a lower portion of the rod, indicated at 34, is flattened and extends through a slot 36 shaped and dimensioned to correspond with the flattened portion 34 of the rod, so that the rod may not turn relative to the end plate 30. Reinforcing bars 38 may be welded or otherwise rigidly secured to the end plate 30 on each side of the slot 36. A hook 40 is pivotally secured by means of an enlarged portion 42 of the hook on the lower end of the flattened portion 34 of the rod, this hook being designed for securement to a strainer in a drain pipe or in the outlet portion of a drain pipe when this strainer is to be found and when this strainer is of cross bar structure or otherwise suitably formed for connection of the hook 40 thereon. When no such structure is to be found, the device can still be secured in position by the use of other fastening means which will now be described in some detail.

This other fastening means includes a tubular shaft 44 arranged coaxially and exteriorly of the rod 32 and extending from a point above the screw cap 14 to a point within the inner cylinder 26 and below the lower end of the outer cylinder 20. The upper end of the tubular shaft 44 is provided with a hand wheel 46 and the lower end has rotatably mounted thereon a transversely extending plate 48. Any simple means for rotatably mounting the plate may be used, Figure 2 illustrating one means wherein the lower end of the tubular shaft 44 is burred to frictionally engage a lower surface portion of the plate 48, as indicated at 50.

Opposite edge portions of the plate 42 are returned to form channels within which oppositely extensible jaws 54 are slidably mounted. Each of these jaws is provided with a serrated drain pipe or outlet engaging terminal portion 56 and the adjacent longitudinal edge portions of the jaws are provided with racks 58. A pinion 60 is rigidly secured to the portion of the tubular shaft 44 immediately above the plate 48, and this pinion operatively engages the racks 58 to allow rotation of the hand wheel 46 manually to force the jaws to extend and retract substantially radially of the drain pipe when the device is in operation.

A yoke 62 has its lower end rigidly mounted on the nut 16 and the upper end 64 of the yoke comprises a collar which guides the upper end 70 of the rod 32, this upper end 70 being threaded, and another nut 66 with wings 68 is screwed onto the threaded portion 70 and is manually operable to force the yoke, outer cylinder 20 and the deformable member 22 downwardly with reference to the rod 32, when this rod is indirectly secured in the drain pipe by means fully described above, it being understood that operation of the nut 68 will cause the rod to be lifted relative to the jaws 54, when these jaws are in engagement with the drain pipe, until the element 42 of the hook 40 engages the end plate 30, after which the inner cylinder 26 will be raised into engagement with the jaw assembly, whereafter the outer cylinder 20 will be carried downwardly with the deformable member 22 on further tightening of the nut 66. A spring plate 72 will be rigidly mounted at one end of the yoke 62 while the other end will engage suitably provided serrations or teeth on the hand wheel 46, so that the jaws when once extended into engagement with the drain pipe will not loosen therefrom until the operator has completed the unblocking of the drain. It may also be noted that the plate 48 must have apertures 74 therein to allow fluid to escape out of the cylinder into the pipe, unless this plate is made considerably smaller than the cross sectional side of the inner cylinder 26.

The operation of this invention will be clearly understood from a consideration of the foregoing description of the mechanical details thereof, taken in connection with the above recited objects. In recapitulation, it may be noted that an environment wherewith this invention will be used will ordinarily include a drain pipe such as that indicated at 76 in Figure 2. This drain pipe may have an outlet 78 secured thereon by a coupling 80 and the outlet 78 will extend through floor structure 82 and 84 and through a bottom panel or outlet portion 86 of the unit of equipment which it is desired to unblock by the use of this device, the shape of the outlet portion 86, of course, varying with different units of equipment. As before stated, in the event that the drain pipe 76 or outlet 78 is provided with a strainer having cross bars or other structure to which the hook 40 can be attached, the jaws 54 then merely act as centering means and means for positively preventing rotation of the hook 40 out of engagement with said cross bars or similar structure. When no such strainer is to be found in the equipment to be unblocked, the operator must rely completely upon the action of the jaws 54 to fasten the device within the drain pipe, these jaws being the indirect means used to hold the deformable member 22 in tight engagement with the outlet 78.

It will be clear that the above described device amply achieves all the objects above mentioned, and further description would appear unnecessary.

Having described the invention, what is claimed as new is:

1. A drain pipe opener comprising a conduit for connection to a source of pressurized fluid, a hollow cylinder connected to the conduit, a deformable resilient member on said cylinder adapted to seat within the mouth of a drain pipe, a rod extending through said cylinder, clamp means to fasten one end of the rod within said drain pipe, and means for shifting said cylinder longitudinally relative to the rod to force said deformable member into sealing engagement in the mouth of the drain pipe, said clamp means including a tubular shaft extending coaxially through said cylinder, a plate on one end of the tubular shaft, opposing jaws slidably mounted on said plate and extensible for engagement with the drain pipe, opposing racks on said jaws, a pinion fixed to said tubular shaft and engaged with both said racks, and means to limit the axial movement of the rod in one direction relative to said plate.

2. A drain pipe opener comprising a conduit for connection to a source of pressurized fluid, a hollow cylinder connected to the conduit, a deformable resilient member on said cylinder adapted to seat within the mouth of a drain pipe, a rod extending through said cylinder, clamp means to fasten one end of the rod within said drain pipe, means for shifting said cylinder longitudinally relative to the rod to force said deformable member into sealing engagement in the mouth of the drain pipe, an inner cylinder telescopically mounted in said outer cylinder, means to prevent relative rotation between the cylinders, said clamp means comprising an end plate on said inner cylinder and engaged by said rod in one position, a tubular shaft arranged coaxially of said rod and extending through said outer cylinder and into said inner cylinder, a plate rotatively mounted on the end of said shaft within the inner cylinder, opposing jaws slidably mounted on said plate and extensible into engagement with said drain pipe, said jaws having opposing racks, a pinion on said tubular shaft engaging said racks, said inner cylinder having longitudinal slots through which said jaws extend in operative positions, whereby said inner cylinder is prevented from rotating relative to the rod, said means for shifting the first mentioned cylinder relative to the rod comprising a yoke on said first mentioned cylinder, a threaded element on said yoke, a threaded portion on said rod engaged with said threaded element.

3. A drain pipe opener comprising an outer cylinder, an inner cylinder telescopically mounted in the outer cylinder and having one end extending beyond said outer cylinder, means for preventing relative rotational movement between the cylinder, a conduit leading into said outer cylinder, longitudinal slots in said inner cylinder, a tubular shaft extending coaxially through the outer cylinder and into the inner cylinder, a rod extending coaxially through and beyond each end of the tubular shaft, a transverse plate rotatively mounted on the end of the tubular shaft within the inner cylinder, a pair of opposing jaws slidably mounted on said plate and extending through said slots, each jaw having a rack, a pinion fixed to the said end of the tubular shaft and operatively engaging the rack of each jaw to extend and retract the jaws when the tubular shaft is rotated, an end plate on the said one end of the inner cylinder, said jaws when extended into engagement with a drain pipe comprising stop means limiting the movement of said inner cylinder into said outer cylinder, a deformable resilient member on said outer cylinder adapted for sealing engagement with the drain pipe, said rod engaging said end plate of the inner cylinder in one position, and a yoke on said outer cylinder threadedly engaged with said rod whereby the rod can be rotatively adjusted into said position.

4. A drain pipe opener according to claim 3 and wherein said rod has a hook on the end of the rod adjacent said jaws, said jaws comprising means for holding the opener centered in a drain pipe opening and for preventing rotation of the opener so that said hook can be maintained in engagement with a conventional cross bar strainer in a drain pipe.

JOSEPH B. HORD.

REFERENCES CITED

The following references are of record in the file of this patent:

UNITED STATES PATENTS

| Number | Name | Date |
| --- | --- | --- |
| 1,558,161 | Gunderson | Oct. 20, 1925 |
| 2,200,876 | Ehinger | May 14, 1940 |
| 2,495,754 | Nance | Jan. 31, 1950 |